United States Patent
Miranda et al.

(10) Patent No.: US 11,591,149 B2
(45) Date of Patent: Feb. 28, 2023

(54) WATER-DISPERSIBLE AND BIODEGRADABLE FILMS FOR THE PACKAGING OF LIQUIDS AND MOISTURE-SENSITIVE MATERIALS

(71) Applicant: SMARTSOLVE INDUSTRIES LLC, Bowling Green, OH (US)

(72) Inventors: Nathanael Miranda, Cary, NC (US); Jonathan R. Jakubowski, Bowling Green, OH (US); Giuseppe E. Giammanco, Strongsville, OH (US)

(73) Assignee: SMARTSOLVE INDUSTRIES LLC, Bowling Green, OH (US)

( * ) Notice: Subject to any disclaimer, the term of this patent is extended or adjusted under 35 U.S.C. 154(b) by 163 days.

(21) Appl. No.: 16/942,946

(22) Filed: Jul. 30, 2020

(65) Prior Publication Data
US 2021/0032002 A1  Feb. 4, 2021

Related U.S. Application Data (60) Provisional application No. 62/880,140, filed on Jul. 30, 2019.

(51) Int. Cl.
*B65D 65/42* (2006.01)
*B65D 65/40* (2006.01)
(Continued)

(52) U.S. Cl.
CPC ............. *B65D 65/42* (2013.01); *B32B 27/10* (2013.01); *B32B 27/36* (2013.01); *B32B 29/002* (2013.01);
(Continued)

(58) Field of Classification Search
CPC ....... C08K 3/013; C08K 5/0016; C08L 67/02; C08L 67/04; C08L 2201/06; B65D 65/466; B65D 65/40; B65D 65/42; B32B 2250/02; B32B 2307/7163; B32B 2307/7166; B32B 2307/732; B32B 2307/75; B32B 23/08; B32B 2439/40; B32B 2439/46; B32B 2439/60; B32B 27/10; B32B 27/28; B32B 27/36; B32B 29/002; B32B 37/153;
(Continued)

(56) References Cited

U.S. PATENT DOCUMENTS 3,741,253 A   6/1973  Brax et al.
4,278,738 A   7/1981  Brax et al.
(Continued)

FOREIGN PATENT DOCUMENTS

WO        2014036279 A1    3/2014

*Primary Examiner* — Yan Lan
(74) *Attorney, Agent, or Firm* — Shumaker, Loop & Kendrick, LLP; James D. Miller (57) ABSTRACT

The presently disclosed subject matter is generally directed to a packaging film constructed from water-dispersible and/or biodegradable compositions. Particularly, the disclosed film comprises a first layer constructed from one or more water-dispersible materials, such as water-dispersible paper. The film further comprises a second layer constructed from one or more biodegradable materials, such as poly(hydroxyalkanoate). The first and second layers can be constructed to form a packaging material used to enclose a wide variety of products, including liquids and moisture-sensitive solids. Advantageously, the disclosed film (and associated packaging materials) are dissolvable in water and/or biodegrade when exposed to landfill conditions and/or water.

15 Claims, 4 Drawing Sheets

(51) Int. Cl.
| | |
|---|---|
| *C08L 67/02* | (2006.01) |
| *B32B 29/00* | (2006.01) |
| *C08J 5/18* | (2006.01) |
| *B32B 27/36* | (2006.01) |
| *B32B 37/15* | (2006.01) |
| *B65D 65/46* | (2006.01) |
| *B65B 1/02* | (2006.01) |
| *B65B 1/04* | (2006.01) |
| *B32B 27/10* | (2006.01) |

(52) U.S. Cl.
CPC .............. *B32B 37/153* (2013.01); *B65B 1/02* (2013.01); *B65B 1/04* (2013.01); *B65D 65/40* (2013.01); *B65D 65/466* (2013.01); *C08J 5/18* (2013.01); *C08L 67/02* (2013.01); *B32B 2307/7163* (2013.01); *B32B 2307/7166* (2013.01); *B32B 2439/40* (2013.01); *C08J 2367/02* (2013.01); *C08J 2401/28* (2013.01); *C08J 2431/04* (2013.01); *C08J 2497/02* (2013.01); *C08L 2201/06* (2013.01)

(58) Field of Classification Search
CPC .. B65B 1/02; B65B 1/04; C08G 63/06; C08G 63/16; C08J 2367/02; C08J 2401/28; C08J 2431/04; C08J 2497/02; C08J 5/18; Y02W 90/10
See application file for complete search history.

(56) References Cited

U.S. PATENT DOCUMENTS

| | | |
|---|---|---|
| 4,284,458 A | 8/1981 | Schirmer |
| 4,551,380 A | 11/1985 | Schoenberg |
| 6,769,227 B2 | 8/2004 | Mumpower et al. |
| 8,927,622 B2 | 1/2015 | Speer et al. |
| 9,375,508 B2 | 6/2016 | Konishi et al. |
| 2005/0163944 A1 | 7/2005 | Isshiki et al. |
| 2016/0017092 A1 | 1/2016 | Iwamoto et al. |
| 2016/0326325 A1 | 11/2016 | Lee et al. |

Fig. 6f

WATER-DISPERSIBLE AND BIODEGRADABLE FILMS FOR THE PACKAGING OF LIQUIDS AND MOISTURE-SENSITIVE MATERIALS

CROSS-REFERENCE TO RELATED APPLICATIONS

This application claims the benefit of U.S. Provisional Application No. 62/880,140, filed on Jul. 30, 2019. The entire disclosure of the above application is incorporated herein by reference.

FIELD

The present technology relates to water-dispersible and biodegradable films for the packaging of liquids and moisture-sensitive materials.

INTRODUCTION

This section provides background information related to the present disclosure which is not necessarily prior art.

Problems associated with the handling of environmental waste, particularly the large amounts of plastic products and associated packaging discarded each year, have placed added emphasis on developing compostable and biodegradable materials. In particular, packaging waste produced in the food, beverage, agricultural, and personal care industries remains a growing concern. After use, conventional packaging products are typically incinerated or buried in a landfill, each of which can present a serious environmental impact. Specifically, incineration converts waste products into hazardous air emissions and toxic ashes. Furthermore, landfills typically bury waste in the ground, frequently contaminating waterways and aquifers in the process. To address these environmental issues, packaging products have been developed that dissolve when submerged in water or biodegrade in certain environments (e.g., landfills) where they are exposed to water, oxygen, and the appropriate microorganisms. However, prior art biodegradable packaging materials can be limited to the packaging of dry or non-moisture sensitive materials, such as powders or tablets. It would therefore be desirable to provide biodegradable packaging materials suitable for use with liquids and/or moisture-sensitive solids.

SUMMARY

The present technology includes articles of manufacture, systems, and processes that relate to water-dispersible and biodegradable films, ways of making such films, packages formed using such films, and ways of packaging liquids or moisture-sensitive products.

Water-dispersible and biodegradable films are provided that include a first layer and a second layer. The first layer has from about 60 wt. % to about 100 wt. % of a water-dispersible material. The second layer has from about 95 wt. % to about 100 wt. % of a biodegradable material. Certain embodiments include where the water-dispersible material comprises a water-dispersible paper and/or where the biodegradable material includes a poly(hydroxyalkanoate). The first layer having the water-dispersible material can be printed thereon with one or more indicia, including various types of registered print including labeling, instructions, pictures, graphics, etc. Ways of making such water-dispersible and biodegradable films can include extruding the first layer thereof and coating the first layer with the second layer. Water-dispersible and biodegradable films can be used to form various packages, including where the second layer of such films provides an interior surface of the package. Accordingly, a liquid or moisture-sensitive product can be disposed within an interior of such packages.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2*a* is a side plan view of the first layer and FIG. 2*b* is a side plan view of the second layer.

FIGS. 6*a*-*f* show embodiments of pouches in accordance with some embodiments of the present technology, where

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combinations of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The present technology is directed to a packaging film constructed from one or more water-dispersible and/or biodegradable compositions that is suitable for use with liquids and/or moisture-sensitive solids. Such water-dispersible and biodegradable films include a first layer having from about 60 wt. % to about 100 wt. % of a water-dispersible material and a second layer having from about 95 wt. % to about 100 wt. % of a biodegradable material. The term "water-dispersible," as used herein, refers to the capability of being at least partially soluble and subsequently partially dispersible (e.g., at least about 70% dispersible) to nearly completely dispersible (e.g., about 100% dispersible) in an aqueous solution, such as water. Dispersion can result in fragmentation of the composition into particulate and/or micro-particulate, where a water-dispersible layer or sheet can fall apart in an aqueous solution into such particulate, leaving only 30% or less of the original structure remaining. Water-dispersible materials, as referenced herein, include materials and papers referred to in the art as "water-soluble," where only a portion of the paper may be actually soluble in water, but dissolution of this soluble portion results in dispersion of most or all of the remaining structure. The term "biodegradable," as used herein, refers to materials that can be readily decomposed by biological methods, through a combination of heat, moisture, and/or microbial action. The first layer including the water-dispersible material can accept printing thereon, including registered and random print, where the water-dispersible material can at least partially absorb and/or allow printing inks to dry upon a surface thereof, unlike certain layers that are formed of or that include particular plastics and polymers. In this way, the present water-dispersible and biodegradable films can be used to package liquids or moisture-sensitive products while maintaining their integrity and further accept printing thereon including customized graphics, labeling, etc.

Certain benefits and advantages are attributable to the present water-dispersible and biodegradable films, in addition to the printability and flexibility in manufacture thereof. Of particular note is the fact that the first layer including the water-dispersible material can be dissolved in an aqueous medium. Dissolution of the first layer consequently exposes a substantially greater surface area of the remaining film, including the second layer having the biodegradable material. Greater access to the biodegradable material facilitates biodeterioration, biofragmentation, and assimilation by the action of abiotic factors (e.g., mechanical action, light, temperature, environmental chemicals, etc.) and by the action of biotic factors (e.g., microbial enzymes, aerobic respiration, anaerobic respiration, etc.). Combination of the water-dispersible material and the biodegradable material in the respective layers of the present films therefore allow a structure suitable for contact and use with liquids and/or moisture-sensitive solids, but which can be disposed of in an environmentally responsible manner.

Water-dispersible and biodegradable films provided herein can have various thicknesses, including where the first layer and the second layer independently have various thicknesses. Certain embodiments include where the first layer has a thickness from about 2 mils to about 5 mils and/or where the second layer has a thickness from about 0.5 mils to about 2 mils. Other embodiments include where the first layer has a thickness from about 2 mils to about 30 mils and/or the second layer has a thickness from about 0.5 mils to about 5 mils. Some embodiments include layer thicknesses built up of successive layers of the same material; e.g., laminates of layers, successive coatings, etc. Other embodiments include a single, discrete first or second layer formed by a single process or operation; e.g., a single extruded film, a single coating, etc.

The water-dispersible material of the first layer and the biodegradable material of the second layer can be characterized by one or more certifications or standards that define certain parameters and/or thresholds for water-solubility and biodegradability, respectively. Water-dispersibility can be related to flushability or dispersability in water and in waste water handling and treatment systems, including septic and municipal waste treatment systems. Particular requirements for water-solubility include ISO 20200 for disintegration and FG502 for flushability. Biodegradation can include environmental as well as deliberate microbial degradation through composting, aerobic digestion, anaerobic digestion, including treatment through municipal waste management systems. Particular requirements for biodegradation include ASTM D6868, OECD 301B, ASTM D5511 for anaerobic degradation, ASTM D5988 for soil degradation, ASTM D5271 for freshwater degradation, ASTM D6691 for marine degradation, and ASTM D6400 for industrial composting.

As described, the first layer includes a water-dispersible material, where the water-dispersible material can have the following aspects. Certain embodiments include where the water-dispersible material comprises a water-dispersible paper, such as a cellulosic polymer and/or a plant fiber. Particular examples of cellulosic polymers and plant fibers include carboxymethyl cellulose, a carboxymethyl cellulose salt, and/or wood pulp. The water-dispersible paper, in particular, can enable printing on the first layer. Registered print is also possible, where print appears in the same position on successive repeats or on successive sheets or portions of the films.

Registered printing can include the use of registered repeats that use an "eyespot" on the film or sheet of the film to allow each print image to be in the same place on each film or sheet. The eyespot (e.g., a thin 1" by 0.25" dark colored rectangle) can be located at a corner of the film or sheet and can provide a straight line that the printer system machine eye can "catch" and seal in the same place each printing impression, for example. In certain color printing methods, print registration can include layering of printed patterns to form a multicolor pattern, where registration minimizes position misalignment in overlapped patterns. Printing system machine components, such as a print cylinder, doctor blade assembly, printing plates, stress/friction, etc., can affect registration. Notably, the first layer of the water-dispersible and biodegradable film provided herein can effectively be subjected to registered printing, unlike other materials including many plastics and polymers that cannot effectively absorb or allow proper drying of inks, which can result in undesirable spreading, smearing, bleeding, poor resolution, among other issues. The water-dispersible material of the first layer can provide a suitable substrate for various registered printing methods, including those employing dye-based and pigment-based aqueous inks.

As described, the second layer includes a biodegradable material, where the biodegradable material can have the following aspects. Certain embodiments include where the biodegradable material includes a poly(hydroxyalkanoate). Particular examples of the poly(hydroxyalkanoate) include one or more of poly(hydroxybutyrate), poly(hydroxyvalerate), and poly(hydroxybutyrate-co-hydoxyvalerate). Embodiments of the water-dispersible and biodegradable film can include where first layer comprises fully and partially hydrolyzed vinyl acetate polymers and copolymers and where the second layer includes a poly(hydroxyalkanoate). Other embodiments include where the biodegradable material includes poly(butylene succinate). Poly(butylene succinate) can have moisture barrier properties, can be heat sealable, and can be coated onto the first layer via extrusion coating or using other coating methods, much in the same way poly(hydroxyalkanoates) can be applied.

The first layer and/or the second layer of the water-dispersible and biodegradable film can include various other materials and additives. The first layer can include one or more plasticizers, stabilizers, fillers, and/or processing aids including extrusion aids. The second layer can include one or more plasticizers, stabilizers, fillers, and/or processing aids including coating aids. Each of the first and second layers can independently include one or more colorants, including pigments and/or dyes. Such additives can be included in the respective layers from about 0.1 wt. % to about 5 wt. %.

Where a filler is included in one or both of the first layer and the second layer of the film, the filler can include the following aspects. Fillers can be used to provide opacity and/or to reduce the cost of the first layer and/or the second layer. However, the presence of fillers can have an inverse relationship with heat-sealability and adhesion between the water-dispersible material of the first layer and the biodegradable material of the second layer. In certain embodiments, it can be desirable to keep the amount of a filler below a certain percentage so that first and second layers can adhere together as desired in forming the film; e.g., when the second layer is provided as a coating on the first layer. Particular embodiments include where the first layer and/or the second layer are limited to 50 wt. % or less of one or more fillers. Examples of certain fillers include starch, gelatinized and non-gelatinized starch blends with other biopolymers or petrochemical polymers, cellulose derivatives, lignin, and/or alginate.

Various packages can be made from or include water-dispersible and biodegradable films as described herein. Certain embodiments include where the second layer provides an interior surface of the package. In this way, one of a liquid and a moisture-sensitive product can be disposed within an interior of the package. Examples of such products include shampoo, conditioner, and/or body wash. In other embodiments, the one of the liquid and the moisture-sensitive product can include a drink or foodstuff. Packaging formed using the water-dispersible and biodegradable film can take various forms, such as a pouch, a cup, a lid, a plate, a bottle, a tray, and a container. Where the second layer includes poly(hydroxyalkanoate), for example, a surface of the second layer can be permitted to contact beverages or foodstuffs in certain locales.

In some embodiments, the first layer and/or the second layer of the water-dispersible and biodegradable film can include alginate as a filler. Including alginate can also be accompanied by application of a calcium solution to cross-link the alginate admixed with the remainder of the material and render the alginate insoluble in water, but soluble in solutions containing detergents or weak bases. This can increase the strength of the respective layer while not affecting biodegradability of the second layer, for example. It is noted that cross-linking alginate can lead to undesirable effects in certain applications, such as where the film is used to package laundry and dish detergents, as a reduction of solubility of the alginate can leave a residue on clothes or dishes when the package and contents are designed to be dispensed together as a unit. The use of alginate and cross-linking thereof can therefore be limited in certain applications.

Various ways of making a water-dispersible and biodegradable film are provided by the present technology. These include extruding the first layer having from about 60 wt. % to about 100 wt. % of a water-dispersible material and coating the first layer with the second layer having from about 95 wt. % to about 100 wt. % of a biodegradable material. Also included are methods that extrude one or more first layers and coat the one or more first layers with one or more second layers. Certain embodiments include coating a first side of the first layer with a second layer and other embodiments include coating the first side of the first layer with a second layer and coating a second side of the first layer with another second layer. Where one layer is coated with another layer, the layer to be coated can be subjected to a corona treatment and/or a plasma treatment to promote adhesion of the subsequently coated layer. Other adhesion promoting techniques can be used to increase adhesion between layers, such as the use of a tie layer between layers of the present films, application of an adhesive, and/or texturing methods.

Various methods of making a water-dispersible and biodegradable package are provided by the present technology. Such methods include forming the water-dispersible and biodegradable package using a water-dispersible and biodegradable film as described herein, where the second layer of the film provides an interior surface of the package. Likewise, methods of packaging a liquid or moisture-sensitive product in a water-dispersible and biodegradable package can include disposing a liquid or moisture-sensitive product within an interior of the package, the package formed using the water-dispersible and biodegradable film described herein, followed by sealing the package.

In certain embodiments, the present technology provides methods of making a water-dispersible and biodegradable film that can employ a heat lamp and/or a heated roller. Where the first layer is extruded and the second layer is coated upon the first layer, a heat lamp (e.g., an infrared heat lamp) can be included in the coating process before a drying station and/or a heated roller (e.g., piping inside of the roller cylinder can circulate heated fluid) can be used. For example, poly(hydroxyalkanoates) and other like coatings can be treated at temperatures at or above 350 degrees F. (at or above about 177 degrees C.) to cure and heat-seal the coating forming the second layer. For example, after the first layer is extruded and after the second layer is coated on the first layer, the film can be subjected to the heat lamp and/or the heated roller to cure the second layer including the poly(hydroxyalkanoate). In this way, the poly(hydroxyalkanoate) can be quickly cured onto the first layer including the water-dispersible material, which can limit the ability of a water-based composition of the poly(hydroxyalkanoate) in the second layer coating from weakening the first layer including the water-dispersible material, which could compromise integrity of the first layer, resulting in a break or tear in the film before reaching a dryer station, for example.

Using a heat lamp in making the water-dispersible and biodegradable film can provide several advantages. In particular, subjecting the water-dispersible and biodegradable film to the heat lamp after the first layer is coated with the second layer and prior to exposing the water-dispersible and biodegradable film to a dryer allows a thickness of the first layer to be reduced. A thickness of the first layer can be reduced from 5 mils (or more) down to thicknesses as low as 2 mils. This represents a savings in materials and a cost reduction in the first layer including the water-dispersible material. What is more, the reduction in thickness of the first layer allows for a more flexible film that can be employed in a greater number of packaging and consumer goods applications. In particular, the present technology has determined that the higher a ratio of water-dispersible material (e.g., water-dispersible paper) in the first layer in relation to the biodegradable material (e.g., poly(hydroxyalkanoate)) in the second layer, the more rigid the resulting film or packaging. Conversely, the lower the ratio of water-dispersible material to biodegradable material, the more flexible the resulting film or packaging. Positioning the heat lamp prior to a dryer or drying step can also increase crystallinity of a polymer component of the biodegradable material. Increased crystallinity can result in a stronger and/or more thermally stable second layer. Yet another benefit of using the heat lamp following coating of the first layer with the second layer is a reduction of wrinkling in the film. The present technology has determined that wrinkles in the resulting water-dispersible and biodegradable film are minimized the quicker the polymer component of the biodegradable material in the second layer coating is cured.

Packages in the form of pouches can be fabricated using the water-dispersible and biodegradable films provided herein. For example, water-dispersible and biodegradable pouches can be constructed where the second layer provides an interior surface of the package and a liquid and/or a moisture-sensitive product can be disposed within an interior of the pouch. Certain embodiments include pouches formed using a film having a first layer comprising 3 pt water-dispersible paper along with a second layer comprising a 25 micron coating of a poly(hydroxyalkanoate). The pouches can be constructed in various shapes and forms. For example, four-sided pouches can be formed using two sheets of water-dispersible and biodegradable film, where three sides of each pouch are sealed, the pouches are filled from the open fourth side with various contents, and then the fourth side of each pouch is sealed using an impulse heatsealer. Examples of contents used to fill such pouches include shampoo, conditioner, sunscreen, liquid soap, solid or powdered soap, balm, makeup foundation, lipstick, etc. Such pouches maintain their integrity, the seals remain intact, and exhibit a long shelf-life.

In certain embodiments, the second layer is coated onto the first layer to form the water-dispersible and biodegradable film. Where the biodegradable material of the second layer includes a poly(hydroxyalkanoate), coating conditions can include the following aspects. Crystallization can occur at about 140 degrees C., where for extrusion coating, the melt temp can be above 150 degrees C. and can therefore permit a degree of crystallization and/or can be tailored to favor increased crystallization. For emulsion coating, including other coating methods where heat levels are below 140 degrees C., one or more heat lamps (e.g., infrared heat lamps) can be employed to ensure that crystallization occurs, when desired. As described herein, crystallization of a polymer included as the biodegradable material can increase the strength and/or thermal stability of the second layer and hence improve fitness of the overall film in certain applications, while allowing a reduction in thickness of the first layer of the film.

The present technology further contemplates a coating or varnish applied to the first layer of the water-dispersible and biodegradable film opposite to the second layer. In this construct, the first layer is intermediate the varnish and the second layer. The varnish can include a biodegradable material, similar to the second layer, and can include all the aspects of the second layer as described herein. Accordingly, the varnish can take the form of another second layer, where the second layers sandwich the first layer therebetween. Particular applications of the water-dispersible and biodegradable film can benefit by preventing premature dissolution of the first layer including the water-dispersible material. Application of a biodegradable varnish can create a protectant layer that can prevent moisture from causing dispersion of the water-dispersible material. The varnish can meet biodegradability standards as described for the biodegradable material of the second layer in order to achieve biodegradation and/or home composting requirements and allow the entire film or package or other structures incorporating the film to be biodegradable and/or home compostable. Use of the varnish can also make the water-dispersible and biodegradable film suitable for situations or applications requiring zero or limited dissolution of the first layer before final use; for example, where the film could be exposed to moisture, such as rain or high levels of humidity, while being shipped, as well as protecting the film from moisture resulting from human handling, moisture in warehousing environments, or moisture from a humid environment like a bathroom.

Having described various aspects of the present technology, example embodiments are provided with reference to the several figures enclosed herewith.

Figure 1:
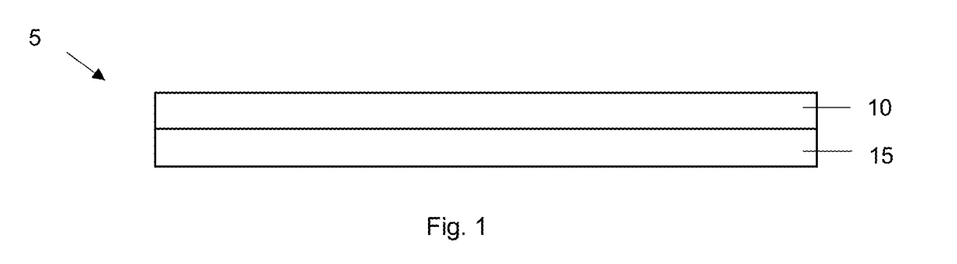
FIG. 1 is a side plan view of a packaging film in accordance with some embodiments of the present technology.

As shown in FIG. 1, a water-dispersible and biodegradable film 5 comprises first layer 10 and second layer 15. The first layer 10 is constructed from one or more water-dispersible materials, such as water-dispersible paper. Second layer 15 is constructed from one or more biodegradable materials, such as (but not limited to) poly(hydroxyalkanoate). The first and second layers 10, 15 can be joined together to produce a packaging material used to enclose a wide variety of products, including liquids and moisture-sensitive solids. Advantageously, the film 5 (and associated packaging materials incorporating such) are dissolvable in water and/or biodegrade in a municipal water treatment system, in a landfill, and/or in water.

As set forth above, film 5 includes first layer 10 positioned adjacent to second layer 15. As used herein, the term "adjacent" refers to the positioning of two film layers in contact with one another with or without any intervening layer, tie layer, adhesive layer, or other layer therebetween. Thus, in some embodiments, first and second layers 10, 15 are "directly adjacent" to each other and are in contact without any tie layer, adhesive layer, or other layer therebetween.

Figure 2A:
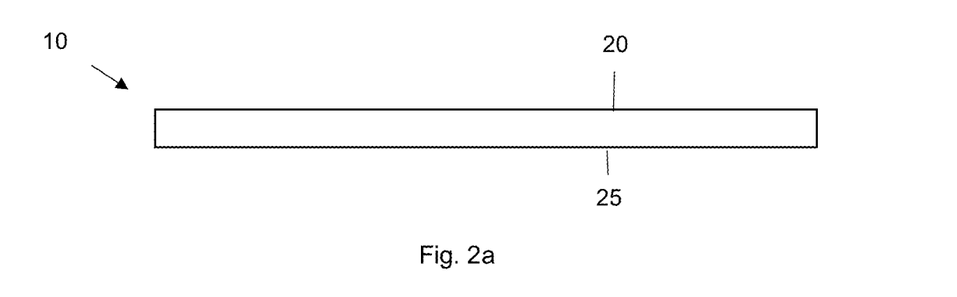
FIGS. 2*a*-*b* show side plan views of first and second layers of the packaging film of FIG. 1, where

FIG. 2a illustrates one embodiment of first layer 10 comprising outer surface 20 and inner surface 25. The outer film surface 20 can be the user-contact surface (e.g., the surface the user directly handles during use). Inner surface 25 is adjacent to second layer 15, as described in more detail herein below.

First layer 10 can comprise any desired water-dispersible material, such as (but not limited to) water-dispersible paper. For example, in some embodiments the water-dispersible material can comprise polyvinyl alcohol (fully- and partially-hydrolysed polyvinyl acetate), co-polymers based on polyvinyl alcohol (fully- and partially-hydrolysed vinyl acetate copolymers), cellulose ether, lignin, polymers based on polyvinyl pyrrolidone, polyethylene glycol, xanthan gum, guar gum, polyquaternium polymers, pullulan, hydroxypropylmethyl cellulose, hydroxyethyl cellulose, hydroxypropyl cellulose, gelatine, sodium salt of carboxymethylcellulose, sodium alginate, gum tragacanth, acacia gum, gum arabic, polyacrylic acid, methylmethacrylate copolymer, carboxyvinyl polymer, amylases, natural and modified starches, aluminium starch octenylsuccinate, hydroxypropyl starch phosphates, high amylase starch, high amylase hydroxypropylate starch, dextrin, pectin, chitin, chitosan, levan, elsinan, collagen, zein, gluten, soya protein isolate, milk protein isolate, casein, carob bean gum, karaya gum, carrageenan, gellan gum, agar, alginic acid and alginates, furcellaran, polyhydroxy acid polymers, and mixtures thereof.

The water-dispersible materials can make up about 60-100 weight percent of first layer 10, based on the total weight of the first layer 10. In addition to the water-dispersible material(s), first layer 10 can include one or more additives, such as (but not limited to) plasticizers, stabilizers, pigments, dyes, fillers, processing aids, and the like in an amount of about 0-40 weight percent, based on the total weight of the first layer 10. Such additives are well known in the packaging art.

First layer 10 can have any desired thickness, so long as the first layer 10 provides the desired properties for the particular packaging operation in which the film 5 is used, e.g., seal strength, modulus, and the like. Typical layer thickness can range from about 2 to 30 mils (e.g., 2 to 30 points when the first layer comprises paper). Thus, first layer 10 can have a thickness of at least about (or no more than about) 2, 3, 4, 5, 6, 7, 8, 9, 10, 11, 12, 13, 14, 15, 16, 17, 18, 19, 20, 21, 22, 23, 24, 25, 26, 27, 28, 29, or 30 mils.

In some embodiments, outer surface 20 of the first layer 10 can include printed indicia, such as product size, type, manufacturer name, use instructions, artwork, designs, and the like. Any suitable printing method can be used, such as rotary screen, gravure, and/or flexographic techniques. Such printing methods are well known to those of ordinary skill in the packaging art.

In some embodiments, first layer 10 meets the standards for one or more internationally recognized protocols, such as ASTM D6400, OECD 301B, ASTM D6868, EN13432, ISO 14885, ISO 17088, ISO 18606, and AS 4736 for biodegradation and compostability, ISO 20200 for disintegration, and/or FG502 for flushability, each of which is incorporated by reference herein in its entirety.

Figure 2B:
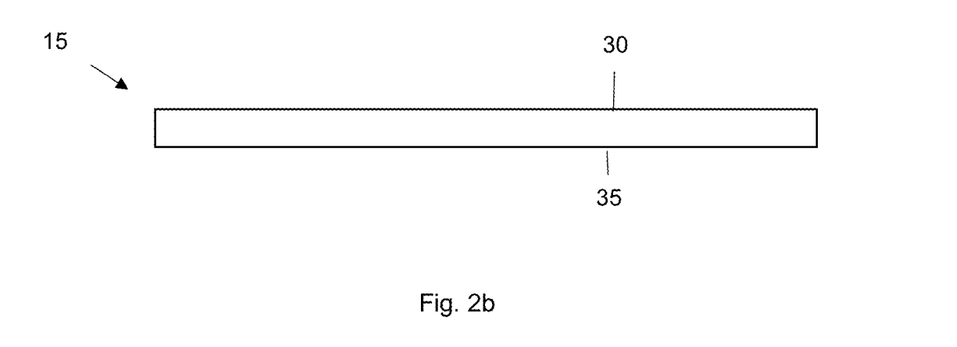

FIG. 2b illustrates one embodiment of second layer 15. As shown, the second layer 15 includes outer surface 30 and inner surface 35. The outer surface 30 is adjacent to inner surface 25 of the first layer 10. Inner surface 35 can be the product-contact surface of the film 5 (e.g., the surface directly in contact with the packaged product during use).

Second layer 15 comprises one or more biodegradable materials, such as (but not limited to) poly(hydroxyalkanoate) ("PHA"). PHA refers to a family of naturally renewable and biodegradable biopolyesters, stored within cells as energy and storage materials by various microorganisms. Due to their biocompatibility and biodegradability, PHAs are considered "green" plastics. Any desired PHA can be used, such as one or more of poly(hydroxybutyrate)(PHB), poly(hydroxyvalerate)(PHV), or blends thereof.

PHB has been the subject of extensive studies as an environmentally friendly polymeric material. The poly-3-hydroxybutyrate (P3HB) form of PHB is the most common, the structure of which is shown below as Formula (I):

(I)

Poly-4-hydroxybutyrate (P4HB) is another form of PHB, the structure of which is shown below as Formula (II):

(II)

Similarly, PHV has been studied for its biodegradable characteristics and as an alternative for many non-biodegradable plastics. PHV is a thermoplastic linear aliphatic polyester, formed by the copolymerization of 3-hydroxybutanoic acid and 3-hydroxypentanoic acid. The structure of PHV is shown below by Formula (III):

(III)

In some embodiments, second layer 15 can comprise about 95-100 weight percent PHB or PHV, depending on the total weight of the layer. Alternatively, the second layer can include about 95-100 weight percent of one or more PHA copolymers. The term "copolymer" refers to polymers formed by the polymerization reaction of at least two different monomers. One example of a suitable copolymer that can be used is poly(hydroxybutyrate-co-hydroxyvalerate) ("PVHB"). The structure of PVHB is shown below by Formula (IV):

(IV)

The PVHB copolymer can include any desired ratio of PHB and PHV. For example, the copolymer can comprise about 1-99 weight percent PHB and about 99-1 weight percent PHV, based on the total weight of the layer. Thus, second layer 15 can include a copolymer comprising about 1, 5, 10, 15, 20, 25, 30, 35, 40, 45, 50, 55, 60, 65, 70, 75, 80, 85, 90, 95, or 99 weight percent PHB and about 99, 95, 90, 85, 80, 75, 70, 65, 60, 55, 50, 45, 40, 35, 30, 25, 20, 15, 10, 5, or 1 weight percent PHV.

Another example of a suitable copolymer that can be used is poly(3-hydroxybutyrate-co-4-hydroxybutyrate) (P3HB-P4HB). The structure of P3HB-P4HB is shown below by Formula V:

(V)

The P3HB-P4HB copolymer can include any desired ratio of P3HB and P4HB. For example, the copolymer can comprise about 1-99 weight percent P3HB and about 99-1 weight percent P4HB based on the total weight of the layer. Preferably, the P4HB content is between 5 to 50 percent.

Yet another example of a suitable polymer that can be used as a biodegradable material includes poly(butylene succinate), shown below by Formula VI:

(VI)

Second layer 15 can optionally include one or more additives, such as (but not limited to) stabilizers, pigments, dyes, fillers, processing aids, and the like in an amount of about 0-5 weight percent, based on the total weight of the layer. These additives are well known in the packaging art.

Second layer 15 can have any desired thickness, such as about 0.5-5 mils. Thus, the second layer can have a thickness of about 0.5, 1, 1.5, 2, 2.5, 3, 3.5, 4, 4.5, or 5 mils. Preferably, the second layer 15 is thick enough to seal, enclose, and protect the packaged product but thin enough to physically break down into smaller biodegradable pieces when first layer 10 dissolves in water. Preferably, second layer 15 is 0.5 mils thick.

As set forth above, in some embodiments film 5 comprises first and second layers 10, 15 positioned directly adjacent to each other, without any additional layers in between or in contact with first and second layers 10, 15. Thus, in some embodiments, film 5 can be a two-layer film. However, in some embodiments, film 5 can have greater than 2 layers, and can include one or more barrier layers, core layers, and/or tie layers positioned in between layers 10, 15 and/or or either side of the first and second films. It is also possible to have a varnish applied to the outer surface 20 of the first layer 10, where the varnish is similar or identical to the second layer 15, as described herein.

The term "barrier layer" refers to a film layer that has a low permeability to gases, such as oxygen. Suitable barrier layer materials can include (but are not limited to) polyvinyl alcohol (PVOH), biodegradable polyesters, silicon dioxide, or blends thereof. The barrier layer can dissolve or physically break down into smaller biodegradable pieces when first layer 10 disperses in water.

As used herein, the term "core layer" can refer to any internal film layer that has a primary function other than serving as an adhesive or compatibilizer for adhering two layers to one another. In some embodiments, the core layer or layers provide the multilayer film with a desired quality, such as, level of strength, modulus, optics, added abuse resistance, and/or specific impermeability. The core layer or layers must be able to physically break down into smaller biodegradable pieces when first layer 10 dissolves in water.

As used herein, the term "tie layer" refers to any internal layer or layers having the primary purpose of adhering two layers to one another. The tie layer or layers must be able to break down into smaller biodegradable pieces when first layer 10 dissolves in water.

In some embodiments, second layer 15 passes one or more of ASTM D5511 for anaerobic degradation, ASTM D5988 for soil degradation, ASTM D5271 for freshwater degradation, ASTM D6691 for marine degradation, and/or ASTM D6400 for industrial composting, each of which is incorporated by reference herein in its entirety.

Film 5 can be constructed using any suitable method known to those of ordinary skill in the art, including (but not limited to) co-extrusion, lamination, extrusion coating, and combinations thereof. See, for example, U.S. Pat. No. 6,769,227 to Mumpower; U.S. Pat. No. 3,741,253 to Brax; U.S. Pat. No. 4,278,738 to Brax; U.S. Pat. No. 4,284,458 to Schirmer; and U.S. Pat. No. 4,551,380 to Schoenberg, each of which is hereby incorporated by reference in its entirety.

Figure 3:
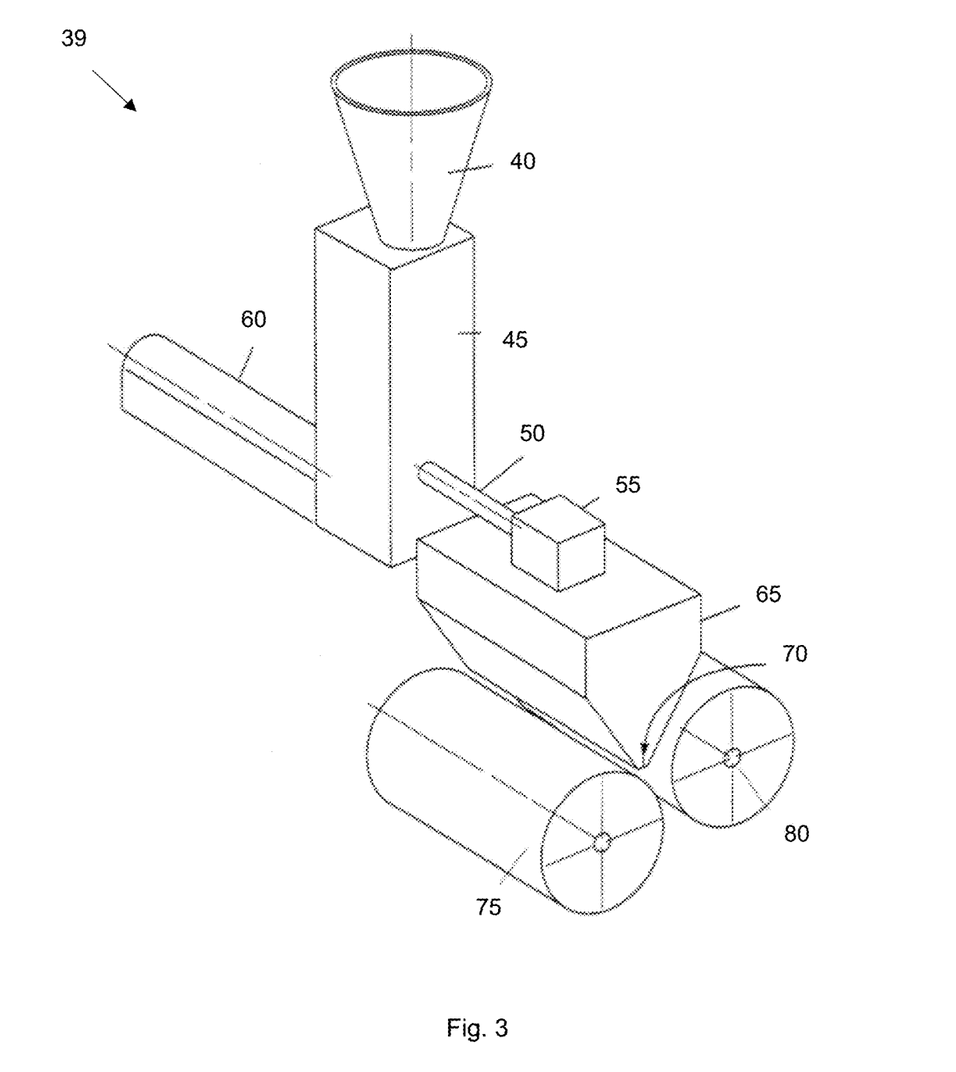
FIG. 3 is a perspective view of an extruder that can be used in accordance with some embodiments of the present technology.
Figure 4:
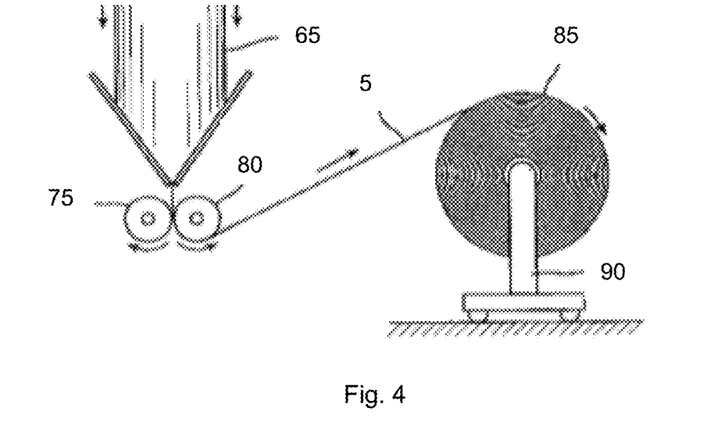
FIG. 4 is a side plan view showing manufacture of a roll of film in accordance with some embodiments of the present technology.

Thus, in some embodiments, film 5 can be constructed using a single screw, slot die extruder as illustrated in FIG. 3. However, it should be appreciated that the presently disclosed subject matter is not limited and any extruder can be used. As shown, extruder 39 includes reservoir 40 for loading resin pellets, leading to extruder barrel 45 where the pellets are heated to a melting point of about 300° F. in some embodiments. Inside the extruder barrel, a rotating screw forces the melted resin through transfer bar 50 and feeding block 55. The rotating screw is driven by motor and armature 60 and can generate pressure to extrude the resin. The extruder includes slot die 65 that defines a width and provides an even cross-sectional thickness and smoothness to the extruded film 5. In some embodiments, slot die 65 can be positioned in the feeding block so that the film 5 exits in a form of a thin curtain. In some embodiments, slot die aperture 70 is at least 0.01 to 0.025 inches wide. The slot die can be positioned over the nip of support roller 75 and pressure roller 80 that are used to coat one surface of first layer 10, (e.g. inner surface 25) of the first layer to form film 5. The film 5 can then be exposed to ambient air or a similar environment having a temperature sufficiently low to cause molten layer 15 to transition from a liquid state to a solid state. Additional cooling/quenching of the film 5 can be achieved by providing a cooling bath or winding film 5 on a cooled roll. The resultant film 5 can then be wound into roll 85 by film winding device 90 as shown in FIG. 4. The film 5 on roll 85 can subsequently be unwound for use (e.g., for packaging applications and/or further processing).

As set forth above, film 5 can be used to construct package 90 that houses one or more liquid and/or moisture-sensitive products 95. The term "liquid product" refers to a product that is in a liquid state at room temperature (about 70° F.). The term "moisture-sensitive product" refers to a product that reacts to moisture, resulting in degradation of a desirable attribute (e.g., such as potato chips that become soggy in the presence of moisture). To this end, product 95 can include a variety of items, such as food, personal care products, and the like. For example, in some embodiments, film 5 can be used to construct personal care sachets (such as those that commonly house shampoo, conditioner, body wash) and/or snack food packages.

Figure 5:
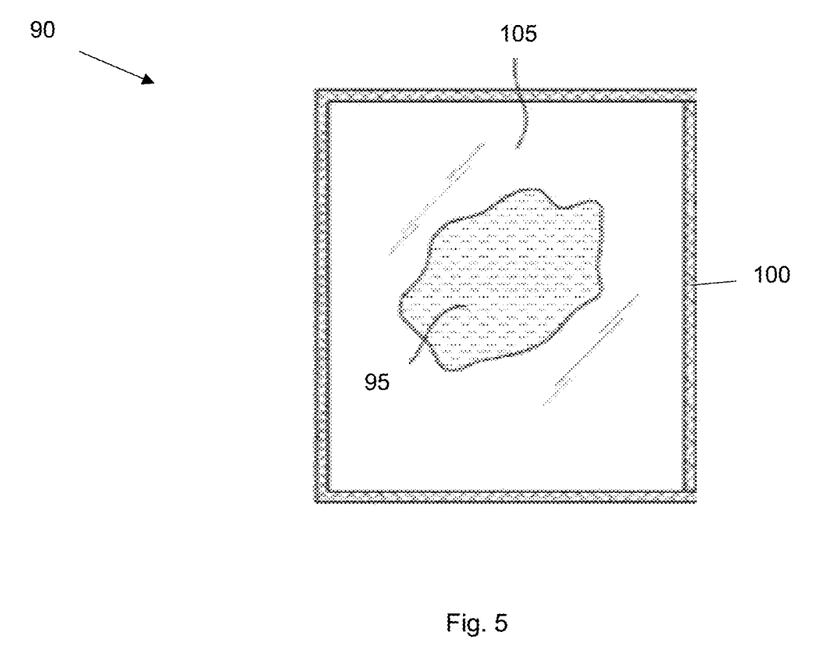
FIG. 5 is a lay flat view of a pouch in accordance with some embodiments of the present technology.

FIG. 5 illustrates one embodiment of a package 90 formed from the film 5 housing a moisture-sensitive product. As shown, the package 90 can include a plurality of edges 100 that are sealed using any known method (e.g., heat seal, adhesive). Edges 100 extend about the perimeter of package 90 to form interior 105 that houses one or more products 95. In some embodiments, at least one edge 100 of the package 90 can be constructed from a fold in film 5. A user can cut the package 90 open using a sharp device (such as a pair of scissors) to access product 95. Alternatively, the package 90 can include an easy-open feature such as a spout or slide closure.

Figure 6A:
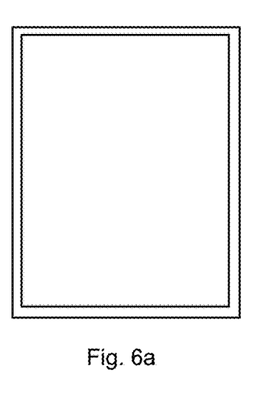
FIGS. 6*a* and 6*b* are views of lay flat pouch designs.
Figure 6B:
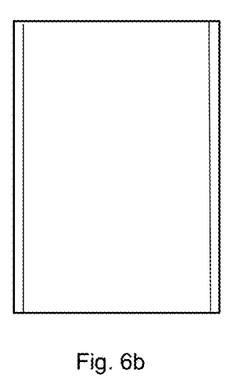
Figure 6C:
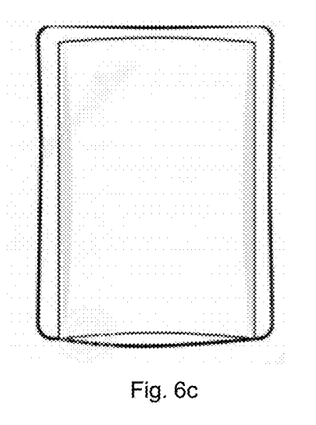
FIG. 6*c* is a perspective view of a stand-up pouch.
Figure 6D:
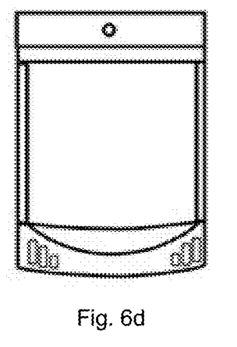
FIG. 6*d* is a perspective view of a slide-closure pouch.
Figure 6E:
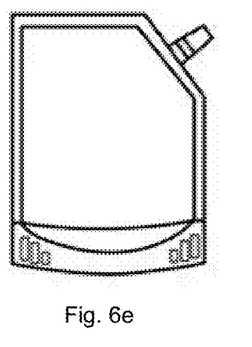
FIG. 6*e* is a view of a lay flat pouch design with a center spout.
Figure 6F:
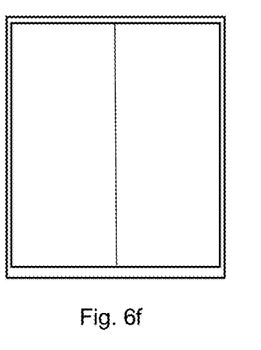
FIG. 6*f* is a view of a lay flat pouch with multiple compartments.

It should be appreciated that package 90 can have any of a wide variety of configurations, as shown in FIGS. 6a-6h. Particularly, package 90 can be constructed as a bag (FIGS. 6a and 6b), a stand-up pouch (FIG. 6c), with a sliding lock closure (FIG. 6d), with a center spout (FIG. 6e), or with more than one compartments (FIG. 6f). It should further be appreciated that package 90 is not limited to the designs of FIGS. 6a-6g and can be configured in any known shape and can have multiple interior 105 portions that each hold the same or different product 95. Further, the disclosed package 90 is not limited to a pouch design, and can include bottles, containers, cups (e.g., coffee cups), lids, boxes, plates, trays, and the like.

An example of a water-dispersible and biodegradable film can be constructed of poly(hydroxybutyrate-co-valerate) (PHBV) coated water-soluble paper having the following characteristics.

TABLE 1

Water-Dispersible and Biodegradable Film Example Composition.

| | Composition | Thickness (microns) |
|---|---|---|
| Layer 1 | Water-soluble paper | 110 |
| Layer 2 | Poly(hydroxybutyrate-co-valerate) | 25 |

TABLE 2

Water-Dispersible and Biodegradable Film Example Barrier Properties.

| | Temperature (° C.) | RH (%) | Rate (cm$^3$/ (m$^2$ · 24 h)) | Coefficient (cm$^3$ · cm/ cm$^2$ · s · cmHg)) |
|---|---|---|---|---|
| Oxygen transmission rate (OTR) | 25 | 50 | 398.43 | 7.555 × 10$^{-11}$ |

TABLE 2-continued

Water-Dispersible and Biodegradable
Film Example Barrier Properties.

| | Temperature (° C.) | RH (%) | Rate (g/(m$^2$ · 24 h)) | Coefficient (g · cm/cm$^2$ · s · Pa)) |
|---|---|---|---|---|
| Water vapor transmission rate (WVTR) | 38 | 90 | 37.40 | 9.407 × 10$^{-14}$ |

TABLE 3

Water-Dispersible and Biodegradable
Film Example Thermal Properties.

| Sample | Melt onset T (° C.) | Melt peak T (° C.) | Enthalpy (J/g) | % Crystallinity |
|---|---|---|---|---|
| PHBV | 158.55 | 174.70 | 35.89 | 32.9 |
| Composite | 133.48 | 167.39 | 25.15 | 65.7 |

The thermal properties of this film were investigated by differential scanning calorimetry and the % crystallinity was calculated from equation 1, shown below, where ΔHm is the melting enthalpy measured for the sample and ΔHm° is the melting enthalpy for 100% crystalline PHBV (*Macromolecules* 1997, 30, 9, 2568-2574).

$$\% \text{ crystallinity} = (\Delta Hm/\Delta Hm°) * 100 \qquad \text{eq. 1}$$

Heat seal strength was investigated for the film at temperatures in the range of 130° C. to 210° C. Samples were sealed using the conditions specified in Table 4, show below, using a HST-H3 heat seal tester (Labthink). Seal strength was measured on film specimens that were 0.5 in. wide and 8 in. long at 30 in/min using an AR1000 adhesion tester (ChemInstruments).

TABLE 4

Heat Seal Strength of Water-Dispersible
and Biodegradable Film Example.

| Temperature (° C.) | Dwell time | Jaw pressure | Adhesion | Seal strength (grams) |
|---|---|---|---|---|
| 130 | 2 sec | 300 KPa | No | — |
| 140 | | | No | — |
| 150 | | | Yes | 127.0 |
| 170 | | | Yes | 191.8 |
| 190 | | | Yes | 149.2 |
| 210 | | | Yes | 175.6 |

Results show that temperatures above 150° C. are needed for the example film to create a heat seal, with temperatures above 170° C. being preferred.

The present technology offers many advantages over prior art packaging materials. Unlike prior art water-dispersible packaging materials, the disclosed packages can be used to house one or more liquids, including those having 30% or more water content. Unlike prior art water-dispersible packaging materials, the disclosed packages can be used to protect one or more moisture-sensitive solids. Unlike prior art bio-degradable packaging materials, a consumer can more easily dispose of the disclosed packages without having to operate a home composting unit or find an industrial composter. In certain embodiments, one simply can disperse the package in a sink or in dishwasher. The components of the package can then bio-degrade in the municipal water treatment system. Additionally, packages formed using the films provided herein can biodegrade if disposed in a landfill, the ground, a river, or the ocean.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A water-dispersible and biodegradable package consisting of:
   a first layer including from about 60 wt. % to about 100 wt. % of a water-dispersible paper, wherein the first layer meets a requirement selected from a group consisting of: OECD 301B, ASTM D6868 for biodegradation, ISO 20200 for disintegration, FG502 for flushability, and combinations thereof, wherein the first layer provides an exterior surface of the package; and
   a second layer including from about 95 wt. % to about 100 wt. % of a biodegradable material, wherein the second layer provides an interior surface of the package.

2. The package of claim 1, wherein the first layer has a thickness from about 2 mils to about 5 mils and the second layer has a thickness from about 0.5 mils to about 2 mils.

3. The package of claim 1, wherein the second layer meets a requirement selected from a group consisting of: ASTM D5511 for anaerobic degradation, ASTM D5988 for soil degradation, ASTM D5271 for freshwater degradation, ASTM D6691 for marine degradation, ASTM D6400 for home/industrial composting, and combinations thereof.

4. The package of claim 1, wherein the water-dispersible paper includes a member selected from a group consisting of: a cellulosic polymer, a plant fiber, and combinations thereof.

5. The package of claim 4, wherein the water-dispersible paper includes a member selected from a group consisting of: carboxymethyl cellulose, a carboxymethyl cellulose salt, wood pulp, and combinations thereof.

6. The package of claim 1, wherein the biodegradable material includes a poly(hydroxyalkanoate).

7. The package of claim 6, wherein the poly(hydroxyalkanoate) includes a member selected from a group consisting of:
   poly(hydroxybutyrate), poly(hydroxyvalerate), poly(hydroxybutyrate-co-hydoxyvalerate).

8. The package of claim 1, wherein the biodegradable material includes poly(butylene succinate).

9. The package of claim 1, wherein the first layer includes fully and partially hydrolyzed vinyl acetate polymers and copolymers and the second layer includes a poly(hydroxyalkanoate).

10. The package of claim 1, wherein one of the first layer, the second layer, and the first layer and the second layer includes from about 0.1 wt. % to about 5 wt. % of an additive selected from a group consisting of: a plasticizer, a stabilizer, a pigment, a dye, a filler, a processing aid, and combinations thereof.

11. The package of claim 1, further comprising at least one indicium printed on the first layer.

12. The package of claim 1, further comprising one of a liquid and a moisture-sensitive product within an interior of the package.

13. The package of claim 12, wherein the one of the liquid and the moisture-sensitive product includes a member selected from a group consisting of: shampoo, conditioner, body wash, and combinations thereof.

14. The package of claim 12, wherein the one of the liquid and the moisture-sensitive product includes a drink or foodstuff.

15. The package of claim 1, wherein the package is configured as a member selected from a group consisting of: a pouch, a cup, a lid, a plate, a bottle, a tray, and a container.

* * * * *